United States Patent [19]
Watanabe et al.

[11] Patent Number: 5,255,254
[45] Date of Patent: Oct. 19, 1993

[54] OPTICAL DISK DEVICE

[75] Inventors: Masayoshi Watanabe; Takashi Ishikawa, both of Yokohama, Japan

[73] Assignee: Hitachi, Ltd., Tokyo, Japan

[21] Appl. No.: 731,614

[22] Filed: Jul. 17, 1991

[30] Foreign Application Priority Data

Jul. 20, 1990 [JP] Japan .................. 2-190653
Feb. 25, 1991 [JP] Japan .................. 3-029843

[51] Int. Cl.$^5$ .............................................. G11B 33/02
[52] U.S. Cl. .................. 369/75.1; 360/97.02; 360/99.02
[58] Field of Search ............... 369/270, 263, 77.1, 369/77.2, 75.1; 360/97.02, 98.03, 99.02, 99.06, 98.04

[56] References Cited

U.S. PATENT DOCUMENTS

| | | | |
|---|---|---|---|
| 4,408,321 | 10/1983 | Yamamura | 369/77.2 |
| 4,464,743 | 8/1984 | Takizawa et al. | 369/75.2 |
| 4,731,777 | 3/1988 | Yoshitoshi et al. | 369/263 |
| 5,042,024 | 8/1991 | Kurosawa et al. | 369/75.1 |

FOREIGN PATENT DOCUMENTS 3530730 3/1986 Fed. Rep. of Germany .

*Primary Examiner*—Paul M. Dzierzynski
*Assistant Examiner*—Don Wong
*Attorney, Agent, or Firm*—Antonelli, Terry, Stout & Kraus

[57] ABSTRACT

An optical disk device is disclosed, in which, in order to taking measures against dust which can cause defects in the detection of signals by an optical pickup, against vibration and against temperature rise of the optical pickup, the optical pickup, a forwarding mechanical portion for forwarding and holding an optical disk and a driving portion for driving the optical disk are held on a chassis in one body, this construction in one body being sealed by a mechanical cover in order to prevent penetration of dust and heat, and in addition this construction in one body is secured to the mechanical cover through elastic bodies. In this way, since penetration of dust and heat into the optical pickup and vibration can be prevented, it is possible to prevent the defects in the detection of signals by the optical pickup.

18 Claims, 6 Drawing Sheets

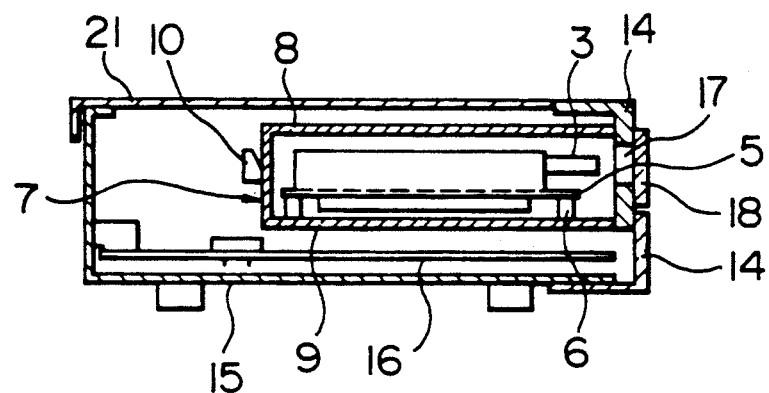
FIG. 1
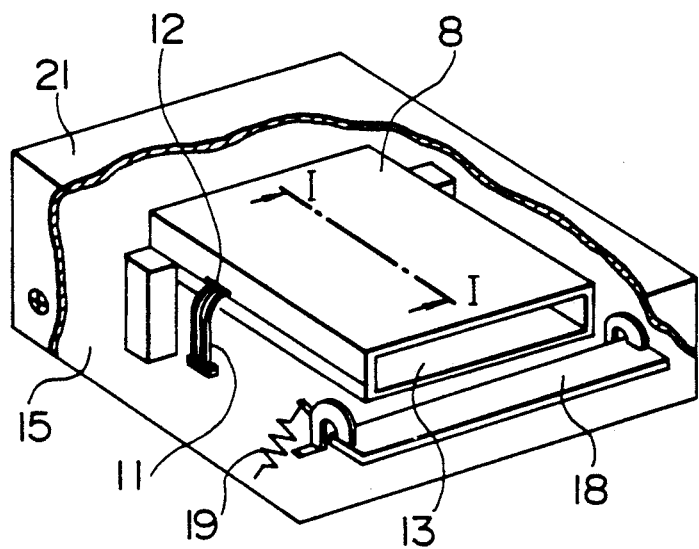
FIG. 2A
FIG. 2B
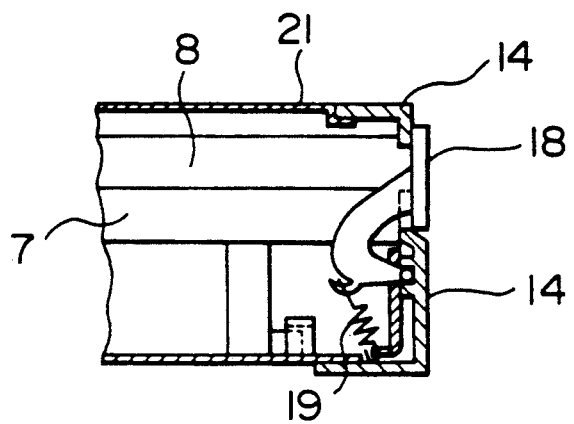

F I G. 5
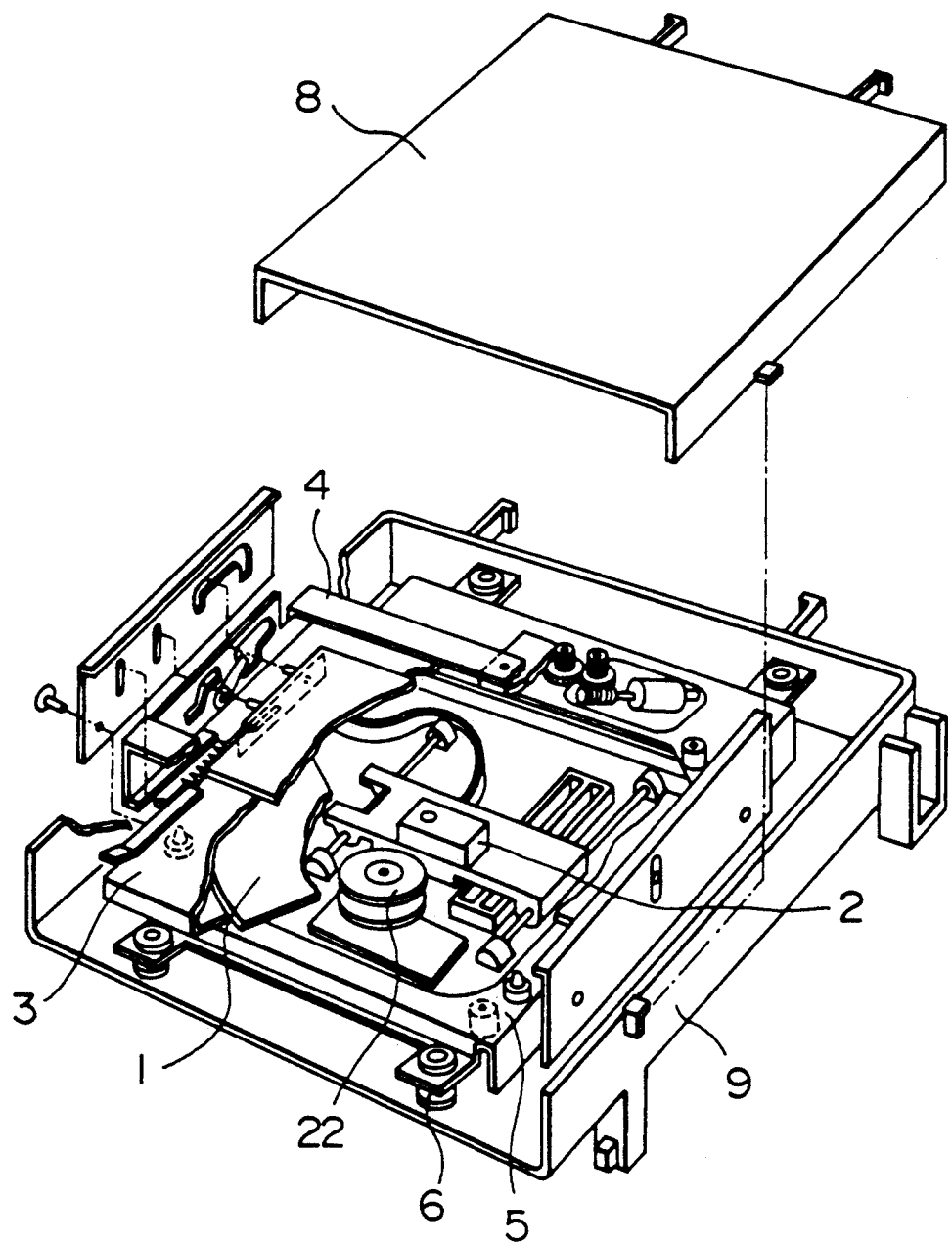

OPTICAL DISK DEVICE

BACKGROUND OF THE INVENTION

The present invention relates to an optical disk device, and in particular to a construction thereof for preventing penetration of dust into the optical disk mounting space and temperature rise in that space.

Heretofore there is known a device of this kind disclosed in JP-A-2-71487. For the device described above, although attention is paid to prevention of penetration of dust into the optical disk mounting portion, attention is not paid satisfactorily to the fact that temperature of an optical pickup rises, which shortens the life of a laser diode and that vibration is transmitted to the optical disk mounting portion, which gives rise to tracking errors and destruction of the optical disk.

SUMMARY OF THE INVENTION

The object of the present invention is to provide an optical disk device capable of being used even at a dusty place, suppressing temperature rise of the optical pickup as far as possible, and further having a vibration proof structure.

In order to achieve the above object, according to the present invention, the driving portion including the optical pickup and the optical disk portion is shielded from the exterior and sealed and in addition the driving portion is supported by elastic bodies as a measure to prevent vibration. Furthermore it is shielded also from heat producing sources in order to reduce temperature rise.

Since a mechanical cover covering the optical pickup portion serves as a shielding member to prevent penetration of dust and heat within a chassis and a door closes the insertion hole after insertion of an optical disk so as to seal it, dust penetrates hardly thereinto. In this way the optical lenses disposed in the device are contaminated scarcely by dust. Further, since the sealed driving portion is supported by elastic bodies, vibration of the pickup due to external vibration is prevented. In this way tracking errors are prevented and at the same time damage of the optical disk due to contact there of with a cartridge can be prevented. Furthermore, since the laser diode is hardly heated, neither erroneous operations nor shortening of the life take place.

BRIEF DESCRIPTION OF THE DRAWING

FIG. 1 is a cross-sectional view of an embodiment of the present invention viewed from a side;

FIG. 2A is a perspective view of the embodiment, the top cover thereof being partly broken to show the interior;

FIG. 2B is a cross-sectional view of the principal part of the device indicated in FIG. 2A.

FIG. 5 is an exploded perspective view of the embodiment illustrating the internal structure;

DESCRIPTION OF THE PREFERRED EMBODIMENTS

Figure 3:
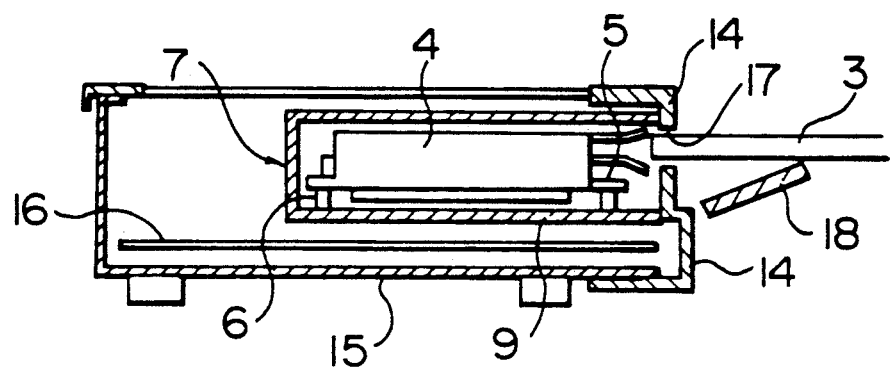
FIG. 3 is a cross-sectional view showing an operation state of the device indicated in FIG. 1 at the insertion of a cartridge.

Hereinbelow the present invention will be explained, referring to the embodiments indicated in FIGS. 1 to 10.

In FIGS. 1 and 2A, the main body of the optical disk device consists of a chassis 15, a front panel 14 mounted on the front of this chassis 15 and a top cover 21 mounted thereon.

Inside the main body is mounted a mechanical cover 7. The mechanical cover 7 is composed of two parts, the upper part 8 and the lower part 9, which are jointed with each other by means of a nail 10.

Figure 4:
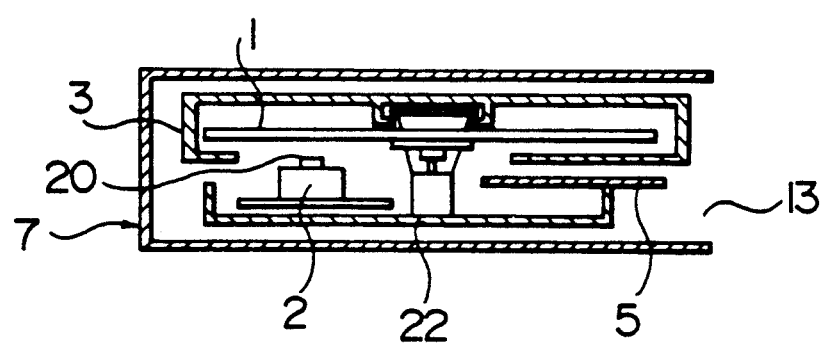
FIG. 4 is a partial cross-sectional view along a line I—I in FIG. 2A.

Inside of the mechanical cover 7 a mechanical chassis 5 is mounted on the mechanical cover 7 through elastic members 6. In FIGS. 3-5, a rotating driving portion 22 which holds an optical disk 1 to rotate it, an optical pickup portion 2 which reads out signals recorded on the optical disk using a light beam, and a forwarding mechanical portion 4 which forwards a disk cartridge 3 incorporating the optical disk 1 from the exterior to the disk rotating portion 22 and load the disk cartridge 3 on the disk rotating portion 22, are mounted on this mechanical chassis 5.

Figure 6:
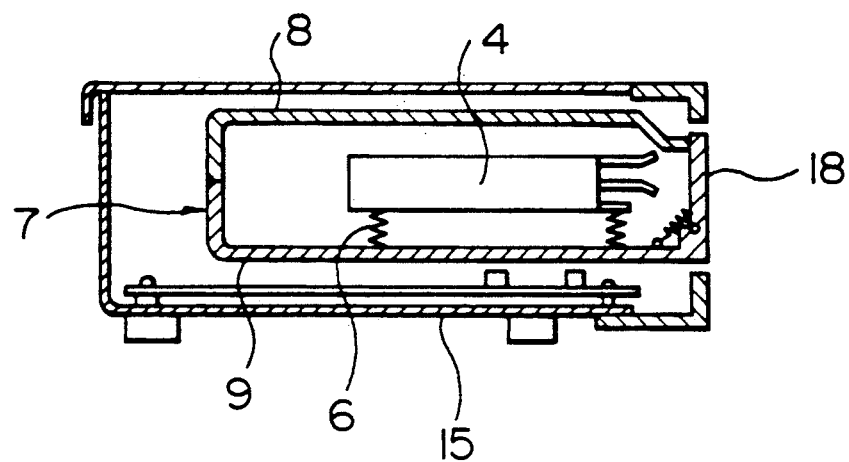
FIG. 6 is a cross-sectional view showing the internal structure of an embodiment of the present invention.
Figure 7:
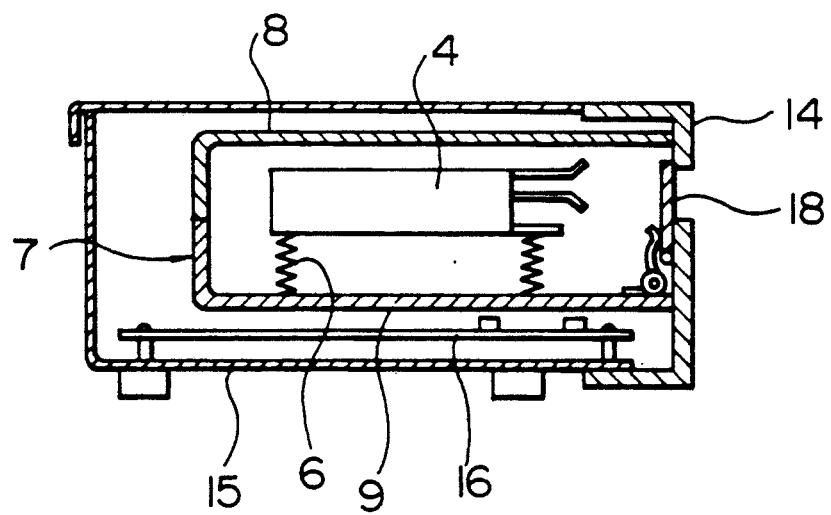
FIG. 7 is a cross-sectional view showing the internal structure of another embodiment of the present invention.
Figure 8:
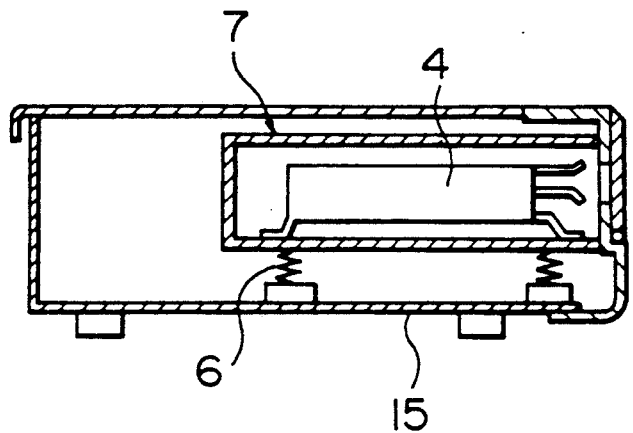
FIG. 8 is a cross-sectional view illustrating an internal structure, in the case where the elastic bodies are disposed outside of the mechanical cover 7.
Figure 9:
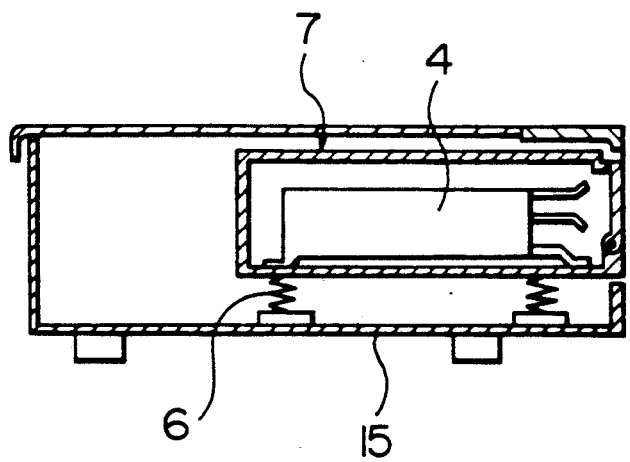
FIG. 9 is a cross-sectional view illustrating another internal structure, in the case where the elastic bodies are disposed outside of the mechanical cover 7.

The mechanical chassis 5 is secured to the mechanical cover 7 by means of screws through gum cushions, as indicated in FIGS. 1 and 3, or elastic bodies such as springs, as indicated in FIGS. 6 and 7, so that vibrations are not transmitted from the exterior thereto. When the elastic bodies 6 are disposed inside of the mechanical cover 7, as indicated in FIGS. 6 and 7, the vibration proof effect is greater than when they are disposed outside of the mechanical cover 7, as indicated in FIGS. 8 and 9, since in FIG. 8 a vibration due to an external shock, transmits to the optical disk and since in FIG. 9 a vibration due to a touch of a person to the door transmits to the optical disk. The transmission of the vibration to the optical disk gives damage to the optical disk and reading errors.

The mechanical cover is closed apart from a hole 12 as small as possible for taking out a controlling line member 11 for the optical pickup portion 2 and a disk cartridge insertion hole portion 17. In the embodiments indicated in FIGS. 1, 3 and 7, the front of the mechanical cover 7 is brought into contact with the front panel 14. A wiring board 16, on which electric parts, etc. are mounted to form a controlling circuit and which is secured to the chassis 15, is disposed between the mechanical cover 7 and the chassis 15. The construction of the mechanical cover 7 is not restricted to that described above, but it may be so constructed that a door 18 is brought into contact with the front of the mechanical cover, as indicated in FIG. 6. Further, although the door 18 is disposed outside of the front panel 14, as indicated in FIGS. 1 and 3, it may be disposed inside thereof, as indicated in FIG. 7.

The front panel 14 has the disk cartridge insertion hole 17 and it is mounted on the chassis 15 so that the whole device has an almost closely sealed structure owing to the chassis 15. Further the door 18 is brought into close contact with the outer surface of the front of the chassis 15 so as to close the insertion hole 17. Furthermore the door 18 is supported pivotably at the side parts of the mechanical cover by bearings on the inner side of the front panel 14 and energized by two springs 19 in the direction, where it is brought into close contact with the insertion hole 17, as indicated in FIGS. 2A and 2B. The optical pickup portion 2 reads out signals by using a laser diode (not shown in the figure), optical lenses, etc. In particular, an objective lens 20 is disposed on a surface thereof opposite to the optical disk 1. The top cover 21 is a cover covering the upper part of the device, which is brought into close contact with the chassis 15 and the front panel 14.

Figure 10:
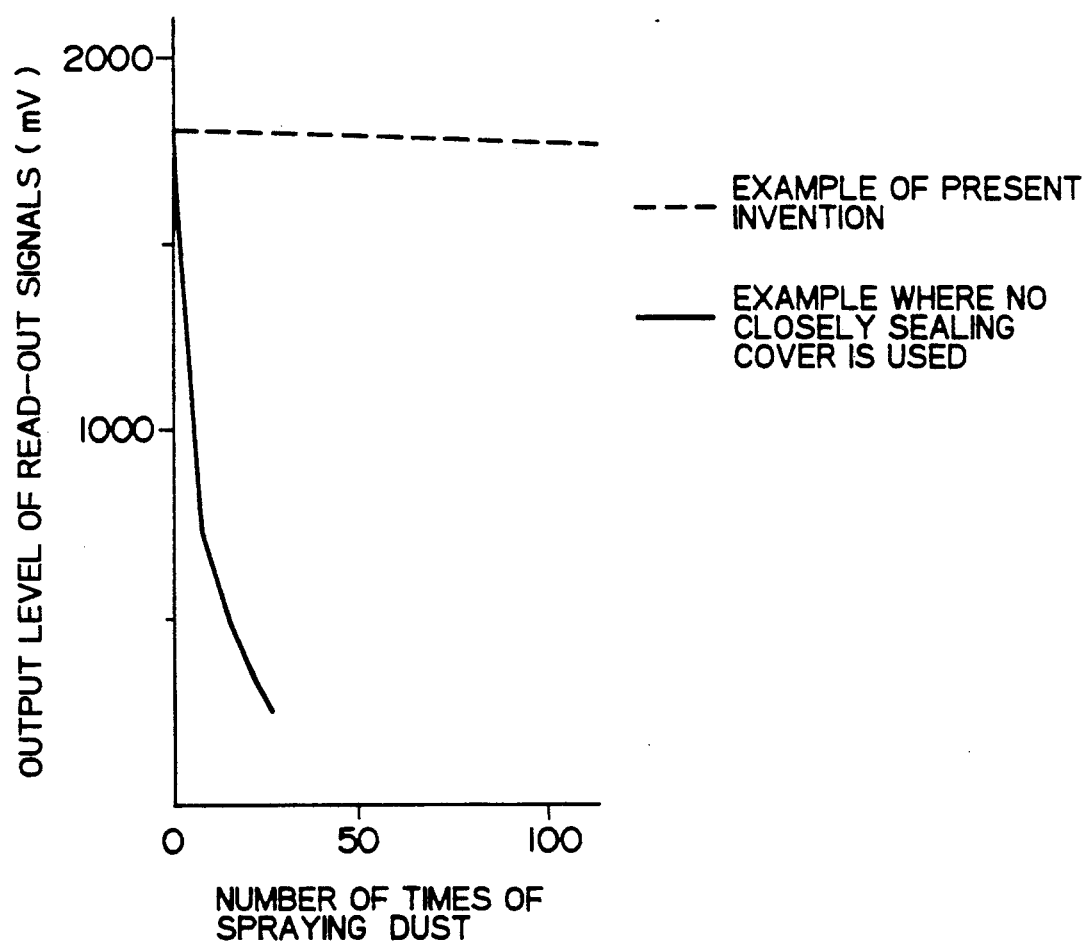
FIG. 10 is a scheme indicating the dust proof effect of the present invention.

Next the operation of the device will be explained. When the door 18 is opened manually and the disk cartridge 3 is inserted, it is pulled-in in the horizontal direction by the forwarding mechanical portion 4 (since this portion doesn't relate particularly to the present invention, the operation thereof will not be described) and thereafter lowered so that the disk cartridge 3 is located in position by the forwarding mechanical portion 4 and the mechanical chassis 5 and further the optical disk is mounted on the rotating portion 22 in a manner that the optical disk 1 does not come in contact with the inner surface of the disk cartridge 3. At this time the door 18 is automatically closed owing to the force of the springs 19 indicated in FIGS. 2A and 2B, so as to be brought into close contact with the chassis so that the optical pickup portion 2 is closely shielded from the exterior. Further the optical pickup portion 2 is shielded by the mechanical cover 7 from heat producing sources inside of the chassis 15 such as the wiring board 16 including electric parts generating heat at the operation, a power supplying transformer not shown in the figure, etc. Since, in addition, the optical pickup is shielded from dust coming from the exterior, it is prevented that the level of the optical signals outputted by the optical pickup 2 is lowered by dirt of the lenses. FIG. 10 indicates experimentally the effect of the present invention. That is, it shows variations in the output level of signals read out by the optical pickup, in the case where an optical disk device, in which the closely shielding cover according to the present invention is used, and another optical disk device, in which it is not used, are located in a space having a predetermiend volume and sand dust, etc. are sprayed periodically in this space. As clearly seen from FIG. 10, it is understood that the optical pickup is protected against dust from the exterior according to the present invention. Further it is shielded by the mechanical cover from heat generated in the wiring board 16 so that the heat is not transmitted to the laser diode in the optical pickup 2.

Furthermore, according to the present invention, the optical disk rotating driving portion 22, the optical pickup portion 2 and the forwarding mechanical portion 4 for forwarding and holding the disk cartridge 3 are mounted on the mechanical chassis 5 so that they are constructed in one body. Since this construction in one body is held by the mechanical cover 7 through the elastic members 6, the optical disk 1, the disk cartridge 3 surrounded it and the mechanism for driving and holding them are arranged relatively in a predetermined correct positional relation and therefore they are so constructed that they are hardly influenced by vibrations from the exterior.

Further, in the prevent invention, it is easy to dispose a cleaning mechanism for cleaning the objective lens by means of a brush in the disk forwarding mechanical portion or the optical pickup portion.

According to the present invention, since it is possible to shield the optical pickup from the exterior by means of the mechanical cover and the door, penetration of dirty atmosphere into the objective lens portion in the optical pickup is reduced and the objective lens doesn't become dirty. In this way the optical signal level is not lowered and the figure of merit is improved several times with respect to the prior art technique. In this way the device can be used for a long time without cleaning. Thus an effect can be obtained that reliability is increased such that no reading errors take place, etc.

Further neither convection of air nor radiation takes place owing to the fact that the optical pickup is shielded by the mechanical cover from heat generating parts and heat is transmitted hardly to the laser diode. Thus an effect is obtained that temperature rise of the laser diode is reduced and that the life is scarcely shortened.

We claim:

1. An optical disk device comprising:
   a forwarding mechanism portion holding dismountably an optical disk;
   an optical pickup, which reads out optically information at least from said optical disk;
   driving means driving said optical disk;
   a holding member holding fixedly said forwarding mechanism portion, said optical pickup and said driving means;
   a covering member enveloping said holding member, said forwarding mechanism portion secured to said holding member, said optical pickup and said driving means;
   chassis members enveloping and holding said covering member;
   a front member disposed in front of said chassis members, in which an optical disk insertion hole, through which said optical disk is mounted and dismounted by an action of said forwarding mechanism portion is formed;
   a door member disposed so as to be freely opened and closed to be brought into close contact with said optical disk insertion hole; and
   a control circuit portion disposed outside of said covering member and inside of said chassis members.

2. An optical disk device according to claim 1, wherein said door member is opened and closed outside of the chassis members and biased by spring biasing means in the closing direction so as to close said optical disk insertion hole.

3. An optical disk device according to claim 1, wherein a bearing portion of said door member is disposed outside of said covering member.

4. An optical disk device according to claim 1, wherein one of said holding member and said optical disk forwarding portion is mounted on the covering member through a vibration absorbing member.

5. An optical disk device according to claim 1, wherein said covering member is in contact with the front member.

6. An optical disk device according to claim 1, wherein said driving means is supported by said covering member through elastic members.

7. An optical disk device according to claim 6, wherein said elastic members are made of gum or consist of springs.

8. An optical disk device according to claim 1, wherein said covering member consists of an upper cover and a lower cover.

9. An optical disk device according to claim 1, wherein said door member is closed at the start of the optical disk.

10. An optical disk device comprising:
means for exchangeably mounting an optical disk to be inserted into the optical disk device;
optical pickup means for optically reading information from the optical disk;
driving means for driving the optical disk;
covering means for substantially enclosing the exchanging means, the optical pickup means and the driving means so as to substantially prevent particles of dust from entering the interior of the covering means from outside of the covering means and accumulating on the optical pickup means, the covering means delimiting the opening through which the optical disk is exchanged so as to the inserted and withdrawn therethrough and including a door member disposed so as to be freely opened and closed so as to cover the opening after insertion and withdrawal of the optical disk;
chassis means for at least partially surrounding the covering means, and control circuit means including at least a first circuit portion disposed outside of the covering means and inside of the chassis means, the first circuit portion generating heat during operation thereof, the covering means being configured so as to substantially isolate the interior of the covering means from heat generated by the at least first circuit portion of the control circuit means and thereby substantially preventing a temperature variation of a laser diode of the optical pickup means during operation of the optical disk device.

11. An optical disk device according to claim 10, wherein the covering means comprises at least one member other than the door member and formed of a material for substantially preventing fluid passage therethrough.

12. An optical disk device according to claim 10, wherein the covering means includes upper and lower case members arranged for being joined together and for cooperating with the door member.

13. An optical disk device according to claim 12, wherein the upper and lower case members are formed of a material for substantially preventing fluid passage therethrough.

14. An optical disk device according to claim 16, wherein the entirety of the control circuit means is disposed outside of the covering means.

15. An optical disk device according to claim 10, wherein the covering means other than the door member is formed of a material for substantially preventing fluid passage therethrough.

16. An optical disk device according to claim 10, further comprising chassis means for at least partially surrounding the covering means, the chassis means cooperating with the covering means to delimit the opening through which the optical disk is inserted and withdrawn, the door member being disposed to cover a portion of the chassis means delimiting the opening.

17. An optical disk device according to claim 16, further comprising elastic means disposed with the covering means for supporting the driving means for the optical disk.

18. An optical disk device according to claim 16, wherein the covering means other than the door member is formed of a material for substantially preventing fluid passage therethrough.

* * * * *